United States Patent [19]
Chilton et al.

[11] Patent Number: 5,469,971
[45] Date of Patent: Nov. 28, 1995

[54] METHOD AND APPARATUS FOR DEAGGLOMERATING POWDER

[75] Inventors: John B. Chilton, Manhasset, N.Y.; Peter H. Gevaras, Bordentown; Paul C. Herb, Lawrenceville, both of N.J.; Thomas W. Wellen, Newtown, Pa.

[73] Assignee: Estee Lauder Inc., New York, N.Y.

[21] Appl. No.: 841,567

[22] Filed: Feb. 26, 1992

[51] Int. Cl.$^6$ .............................. B07B 1/06; B28B 17/02
[52] U.S. Cl. ..................... 209/235; 209/246; 209/283; 209/390; 241/79.2; 425/197
[58] Field of Search ................................... 209/235, 236, 209/243, 244, 245, 246, 274, 281, 283, 390; 425/197, 406, 150; 241/3, 79.2, 87, 89.2

[56] References Cited

U.S. PATENT DOCUMENTS

| | | | |
|---|---|---|---|
| 29,256 | 7/1860 | Earheart | 209/246 X |
| 49,870 | 9/1865 | Foye | 209/283 |
| 184,430 | 10/1987 | Booth | 209/246 |
| 189,583 | 4/1877 | Stackpole | 209/246 |
| 216,549 | 6/1879 | Bassett | 209/283 |
| 221,387 | 11/1879 | Bassett . | |
| 319,311 | 6/1885 | Peters . | |
| 417,631 | 12/1889 | Case . | |
| 466,751 | 1/1892 | Gardner | 209/283 X |
| 766,623 | 8/1904 | Huntley | 209/246 X |
| 896,230 | 8/1908 | Mueller | 209/283 |
| 1,544,964 | 7/1925 | Wooldridge | 209/283 X |
| 1,937,385 | 11/1933 | Hinkle | 209/235 |
| 2,517,508 | 8/1950 | Schroeder | 209/283 |
| 4,214,861 | 7/1980 | Munk et al. | 425/197 X |
| 4,317,649 | 3/1982 | Boellmann | 425/150 |
| 4,401,614 | 8/1983 | De Santis | 425/406 X |

FOREIGN PATENT DOCUMENTS

| | | |
|---|---|---|
| 60-184498 | 9/1985 | Japan . |
| 2-56616 | 2/1992 | Japan . |
| 0035315 | 11/1905 | Switzerland ........................ 209/283 |

Primary Examiner—William E. Terrell
Assistant Examiner—Tuan N. Nguyen
Attorney, Agent, or Firm—Fish & Neave; Richard M. Barnes

[57] ABSTRACT

An apparatus and method for deagglomerating powder which allows for the powder to be pressed immediately after being deagglomerated. The deagglomerating apparatus is preferably mounted on the powder pressing machine or shares the same housing with the powder pressing machine so that deagglomerated powder may pass from the deagglomerating apparatus into the powder pressing machine.

26 Claims, 4 Drawing Sheets

METHOD AND APPARATUS FOR DEAGGLOMERATING POWDER

BACKGROUND OF THE INVENTION

This invention relates to a method and apparatus for deagglomerating powder which reduces the chances of the powder reagglomerating before being pressed into a cake.

Powder which is to be pressed into a cake, such as cosmetic powder, is typically deagglomerated in a powder deagglomerating apparatus before pressing so that the powder will be evenly distributed in the mold in which it is pressed. Powder to be pressed is typically deagglomerated in one location and then transported to a powder pressing machine at another location. Commonly used powder deagglomerating apparati are typically large and employ vibratory motion to vibrate a sifting screen to induce the powder to be sifted through a sifting device. Other such apparati use vacuum suction to pull the powder through the sifting device. The deagglomerated powder is collected in a bin and then transported to a powder pressing machine, where the powder is dumped into the hopper of the pressing machine and allowed to flow into in molds positioned pans. A pressing apparatus compacts the powder in the molds into a cake.

However, the deagglomerated powder may become reagglomerated while it is being transported from the deagglomerating apparatus to the pressing machine or while the powder is being stored prior to pressing. If the powder has become reagglomerated before pressing, it cannot be pressed evenly into a cake. The operator of the machine must then deagglomerate the reagglomerated powder prior to pressing. Such additional deagglomeration is time-consuming, slows the manufacturing process and consequently increases the cost of production.

Furthermore, because commonly used powder deagglomeratig apparati are large in size and capacity, they are not readily adaptable to typical powder pressing machines, which typically handle much smaller quantities of powder, usually not more than ten pounds of powder.

It would, therefore, be desirable to provide a method and apparatus for deagglomerating powder which prevents the deagglomerated powder from becoming reagglomerated prior to pressing. It would also be desirable to provide a method and apparatus for deagglomerating and pressing powder that avoids the step of transporting the deagglomerated powder from the deagglomerating appratus to a separate pressing machine.

SUMMARY OF THE INVENTION

It is therefore an object of this invention to provide a method and apparatus for deagglomerating and pressing powder which prevents the deagglomerated powder from becoming reagglomerated prior to pressing.

It is another object of this invention to provide a method for deagglomerating and pressing powder which avoids the step of transporting the deagglomerated powder to a separate powder pressing machine.

It is further an object of this invention to provide an apparatus for deagglomerating powder which is readily adaptable to conventional powder pressing machines and thus allows the deagglomerated powder to flow directly from the deagglomerating apparatus to the powder pressing machine where it is pressed into a cake.

It is a further object of this invention to provide an apparatus for deagglomerating powder having parts which are easily removable for cleaning and replacement.

It is another object of this invention to provide an apparatus and method for deagglomerating powder which allows the powder to be deagglomerated and pressed without significant delay.

It is yet another object of this invention to provide an apparatus and method for uniformly deagglomerating powder and reducing the likelihood of reagglomeration of such powder.

It is still another object of this invention to provide an apparatus for deagglomerating powder having a means for adjusting powder flow through the deagglomerating apparatus such that the powder is continuously serviced and does not jam the deagglomerating apparatus.

These and other objects of the invention are accomplished by providing a deagglomerating apparatus which is readily adaptable and transparent to a pressing machine. The deagglomerating apparatus preferably has adjustable baffles for regulating powder flow, a sieve means, and a rotating drum assembly carrying brush means which sweeps the powder across and through the sieve means to deagglomerate the powder. The deagglomerated powder then falls into a pressing machine for pressing into a cake.

BRIEF DESCRIPTION OF THE DRAWINGS

Further features of the invention, its nature, and various advantages will be more apparent from the following detailed description of the preferred embodiments and the accompanying drawings wherein like reference characters represent like elements throughout, and in which.

DETAILED DESCRIPTION OF THE INVENTION

Figure 1:
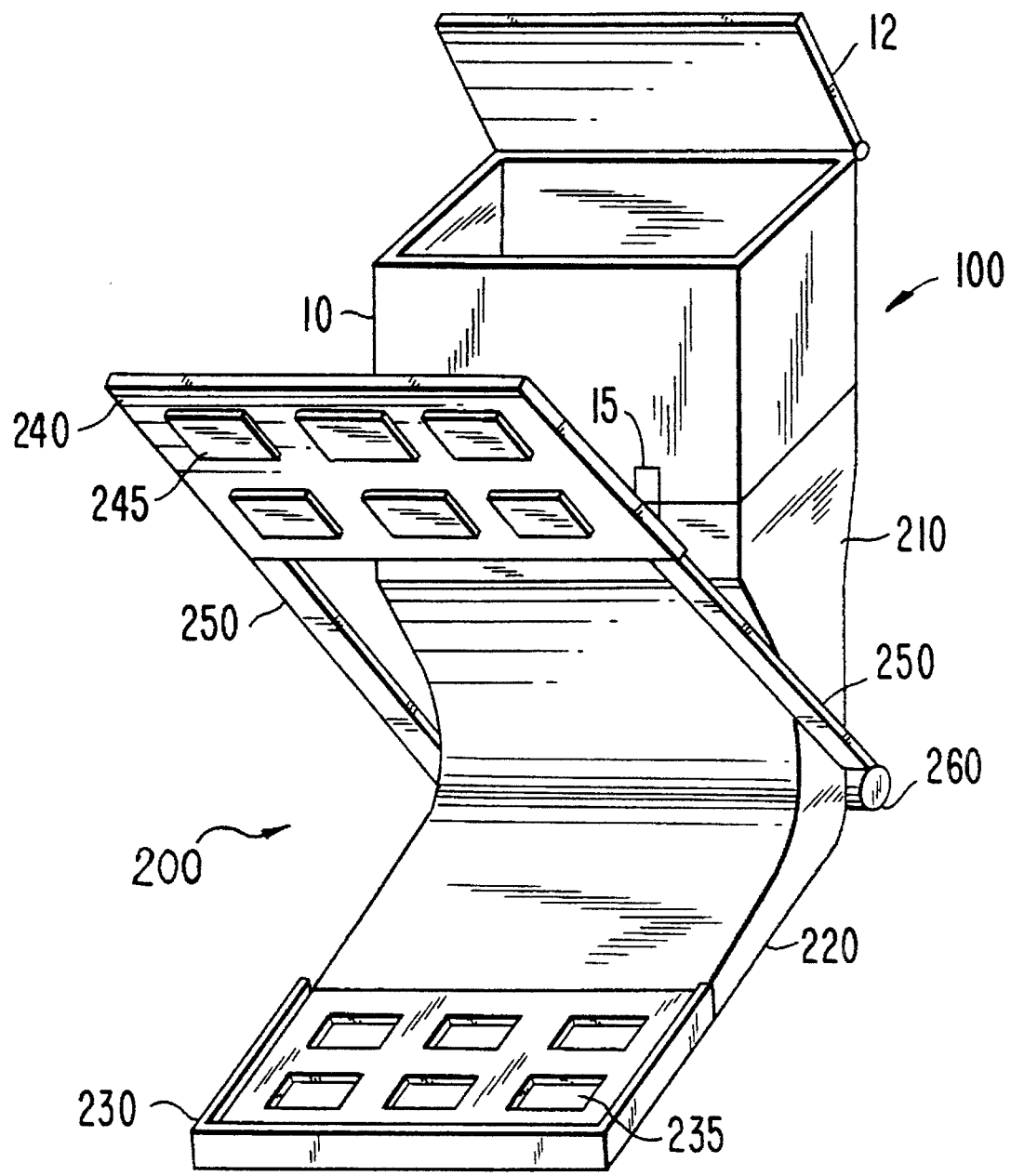
FIG. 1 is an isometric view of a powder deagglomerating apparatus in combination with a powder pressing apparatus in accordance with this invention.

Deagglomerating apparatus 100 is shown mounted on conventional powder pressing machine 200 in FIG. 1. One example of a powder pressing machine useful in accordance with the present invention is a DOSA PAK waffle-style pressing machine, manufactured by Dosa Pak of Milan, Italy. However, other types of pressing machines known in the art may also be used. The powder pressing machine 200 of FIG. 1, hereinafter referred to as presser 200, includes hopper 210, collecting pan 220, and housing 230 for molds 235 in which the powder is pressed. Pressing apparatus 240 includes boss plates 245 which mate with molds 235 to press the powder in molds 235 into a cake. Pressing apparatus 240 is pivotally mounted on arms 250 which are actuated by hydraulic piston 260 to raise or lower pressing apparatus 240 over housing 230. Hydraulic piston 260 is mounted behind presser 200. The housing 10 of deagglomerating apparatus 100, hereinafter referred to as sifter 100, is provided with latches 13 and 15 on the bottom sides of housing 10. Latches 13 and 15 are used to latch housing 10 onto hopper 210 of presser 200 such that the sifting mechanisms of sifter 100 are transparent to presser 200. The dimensions of housing 10 are chosen to correspond to the dimensions of hopper 210 of presser 200 so that sifter 100 forms an extension of hopper 210.

Although powder is specifically referred to herein, the apparatus and method of the present invention may be used with other powder-like substances for which deagglomeration is desirable. Deagglomerating apparatus 100 is shown in FIG. 2 with part of housing 10 cut away to reveal the parts of the apparatus.

Powder (not shown) which is to be deagglomerated by sifter 100 is delivered to the powder presser through the top opening of housing 10. Housing 10 includes a lid 12, having a handle 14 for lifting the lid. Lid 12 is hingedly connected to housing 10 by hinge 11. Adjustable baffle means 20 is provided to regulate the flow of powder within housing 10 so that the powder may be efficiently deagglomerated and does not fall onto the moving parts of the deagglomerating mechanism and jam the mechanism. Baffle means 20 includes at least first and second baffles, 22 and 24, hingedly connected to housing 10 by hinges 23 and 25, respectively.

Figure 2:
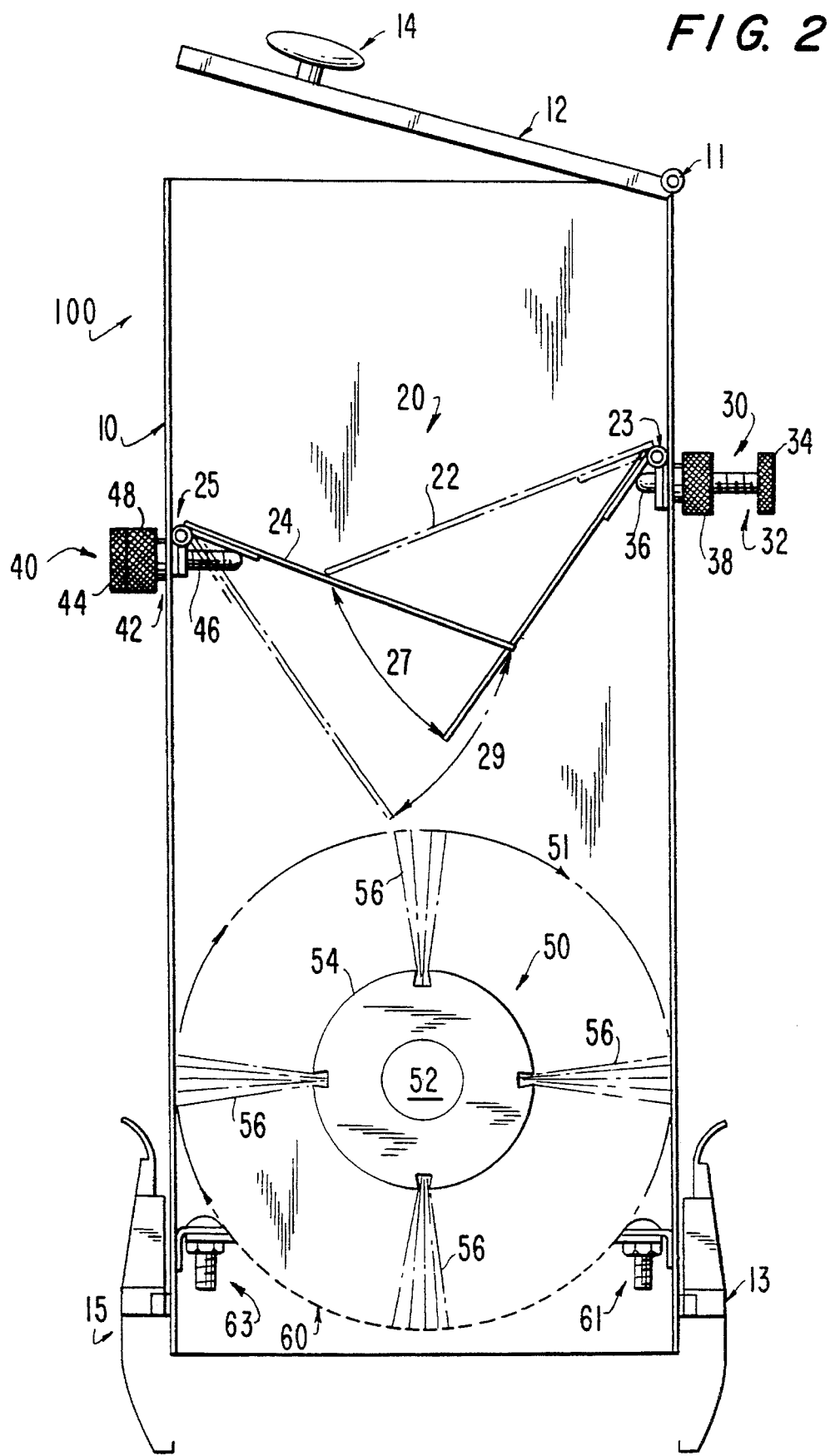
FIG. 2 is a side cut away view of the powder deagglomerating apparatus of FIG. 1.

As shown in FIG. 2, one baffle is preferably positioned higher than the other, in this instance baffle 22. Adjusting means 30 and 40 are provided to adjust the orientation of baffles 22 and 24, respectively, so that baffle 22 may travel along path 27 and baffle 24 may travel along path 29 to regulate powder flow. Adjusting means 30 preferably includes a thumbscrew 32 and a nut 38. Thumbscrew 32 includes head 34 which is turned to adjust the angle of baffle 22 by moving shaft 36 against baffle 22.

Baffle 22 is shown in FIG. 2, in its lowest position, but may be adjusted to provide for proper flow of the powder within sifter 100. Baffle 24 is similarly adjusted by turning head 44 of thumbscrew 42 to move shaft 46 against baffle 24. Adjusting means 40 also includes nut 48. Baffle 24 is shown in FIG. 2 in its highest position, but may be adjusted to provide for proper flow of the powder within sifter 100. The positions of baffles 22 and 24 which are shown in FIG. 2 are for illustrative purposes only. Nuts 38 and 48, which lock thumbscrews 32 and 42, respectively, in place, also may prevent heads 34 and 44 from directly abutting housing 10 so that shafts 36 and 46 do not cause baffles 22 and 24 to become positioned horizontal and thus prevent powder flow into sifter 100, while the deagglomerating apparatus is in use. The position of baffle means 20 may be selected to form a desired flow path for the powder. The specific path is determined by the type of powder used. The path depends on the flow characteristics of the powder, and also the speed at which drum means 50 rotates to deagglomerate the powder.

Drum means 50 and a sieve means such as screen 60 operate in conjunction to deagglomerate powder which is to be pressed by presser 200 on which sifter 100 is placed. Powder which passes through baffle means 20 preferably falls to one side of drum means 50, and not directly on drum means 50. This reduces the likelihood that the force of the powder dropping onto drum means 50 will jam or damage the drum. As shown in FIG. 2, powder falls to the right of drum means 50, and drum means 50 rotates clockwise along direction 51 to sweep powder away as it falls. If, alternatively, baffle 24 is mounted higher than baffle 22, powder would fall to the left of drum means 50, and drum means 50 would have to be rotated counter-clockwise.

Figure 4:
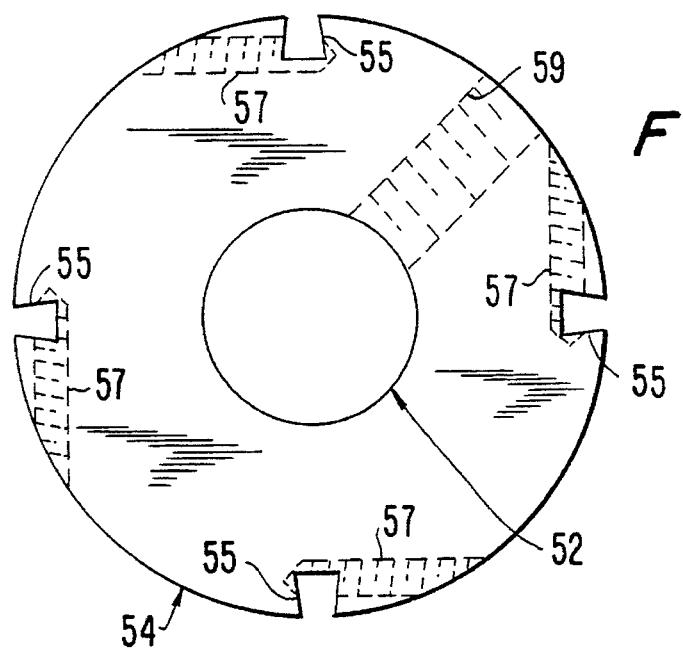
FIG. 4 is a side view of a sieve means in accordance with this invention.

Drum means 50 includes drum 54 mounted on shaft 52, and sweeping means preferably comprising a plurality of sweepers such as bristles 56. Drum 54 is shown in isolation, mounted on shaft 52, in FIG. 4. At least two set screws are positioned in bores such as bore 59 to hold drum 54 onto shaft 52. Drum 54 includes channels 55 along its periphery for holding bristles 56. Preferably, bristles 56 are made of nylon or another similar synthetic material, and are mounted in a preferably steel insert (not shown) which is crimped to clamp the bristles, and is placed in channels 55. Although synthetic fibers are preferably used for bristles 56, natural fibers or even blades may be used. However, because natural fibers break down easily, and blades may exert too much pressure on the powder, thereby causing the powder to be extruded through the screen rather than sifted, selection of natural fiber bristles or blades must be made very carefully. Set screws (not shown) which fit in bores 57, which are substantially perpendicular to the steel inserts, clamp the steel inserts in place. Channels 55 may extend substantially parallel to the longitudinal axis of drum 54, helically around drum 54, or in any other desirable pattern.

Figure 3:
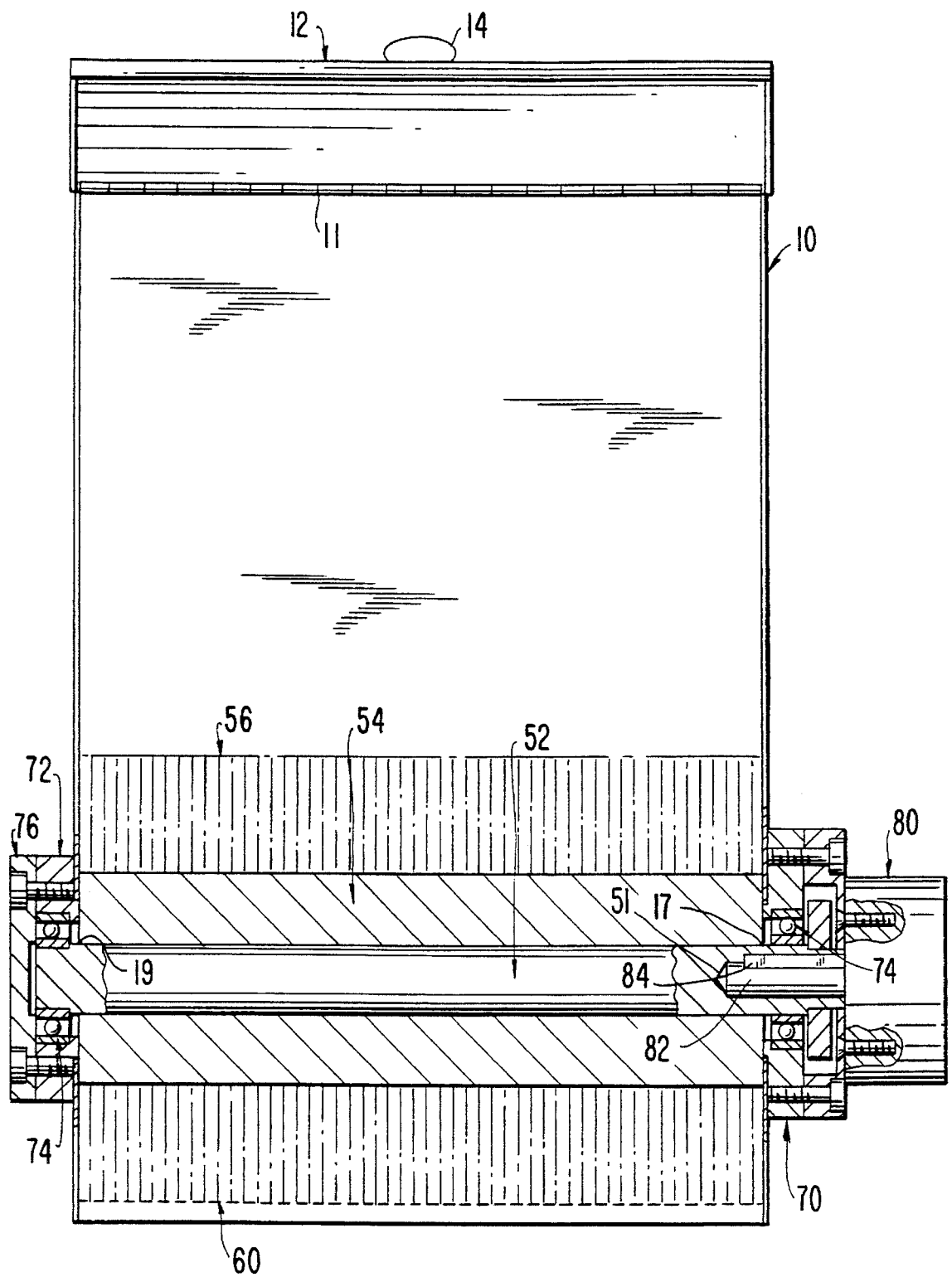
FIG. 3 is a front cut away view of the powder deagglomerating apparatus of FIG. 1.

Shaft 52 is removably mounted in housing 10, as shown in FIG. 3 (in which baffle means 20 have been left out for the sake of clarity). Housing 10 includes apertures 17 and 19 through which shaft 52 passes. Shaft 52 has a ball bearing mounting including main bearing housing 70, end bearing housing 72, ball bearings 74 located in main housing 70 and end housing 72, and end cap 76. Preferably, ball bearings 74 are high speed sealed ball bearings which prevent powder from entering and interfering with the rotation of shaft 52. End cap 76 is removable from apparatus 100 so that shaft 52 may be removed in order to remove drum 54 for cleaning or replacement of bristles 56.

Shaft 82 of motor 80 mates with broached key-way 51 in shaft 52 to drive shaft 52 and rotate drum 54. Broached key-way 51 is preferably round with a substantially square cut in which key stock 84 of shaft 82 is engaged to lock shaft 82 in broached key-way 51. Preferably, motor 80 is an air-operated motor, using the 20–30 p.s.i. air supply typically required by presser 200 to which sifter 100 is joined. Such an air supply is commonly used for air blowers for clearing excess powder from the machinery or for powering pneumatic mechanisms in the powder pressing machine itself. Thus, an air-operated motor is particularly well suited to and cost effective in this invention because of the integration of sifter 100 with presser 200. Although an air-operated motor is an efficient choice, other motors, such as electric motors, may be used, instead.

Figure 5:
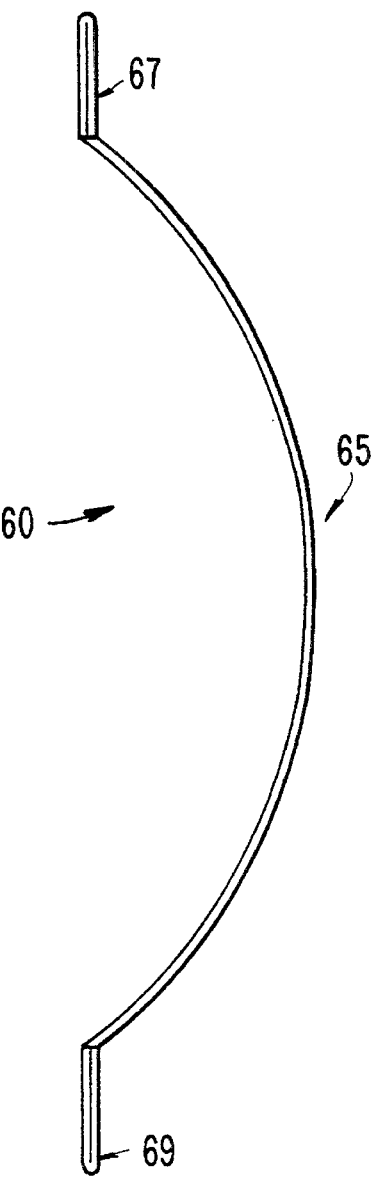
FIG. 5 is a side view of a drum means in accordance with this invention.

Screen 60, shown in FIG. 5, has a curved portion 65, which preferably has the same radius of curvature as drum 54, and is preferably mounted in housing 10 so that the tips of bristles 56 may be moved in close proximity with the top of screen 60. Hence, bristles 56 sweep along the top of screen 60, following the curvature of the screen. Flat portions 67 and 69 of screen 60 are removably mounted in screen mounts 61 and 63, respectively, as shown in FIG. 2, so that screen 60 may be removed from housing 10 for cleaning or replacement. Typically screen 60 is a 60 mesh stainless steel screen, but any size mesh may be used, depending on the powder which is to be deagglomerated.

Sifter 100 is transparent to presser 200. In order to press powder into a cake, an operator simply has to pour a powder or powder-like substance into housing 10 of deagglomerating apparatus 100 which forms an extension of hopper 210 of presser 200. The powder flows through sifter 100 to hopper 210 and collects on collecting pan 220. The powder then may be raked from pan 220 into molds 235 in housing 230. Pressing apparatus 240 is then moved parallel to housing 230, and lowered onto molds 235 to press the powder in molds 235. Hence powder is pressed almost immediately after deagglomeration and does not have the opportunity to reagglomerate during storage or transport from a separate deagglomerating apparatus to the powder presser.

Although deagglomerating apparatus 100, as shown in the accompanying Figures, has a housing which is separate from that of the powder pressing machine and must be connected thereto, it is within the scope of the invention to provide a powder pressing machine that shares the same housing as the deagglomerating apparatus herein disclosed to provide for a one step deagglomerating and pressing apparatus and process.

Although sifter 100 may be made from a variety of materials, including plastics or other synthetic materials, stainless steel is preferably used for forming at least the housing, the baffles, and the screen so that rust or other forms of corrosion do not contaminate the powder.

It will be understood that the foregoing is merely illustrative of the principles of the invention, and that various modifications can be made by those skilled in the art without departing from the scope and spirit of the invention. The described embodiments are presented for the purpose of illustration rather than limitation, and the present invention is limited only by the claims which follow.

What is claimed is:

1. An apparatus for deagglomerating powder comprising:

a housing having an opening for depositing powder into said apparatus;

a sieve means mounted in said housing beneath said opening;

at least one sweeping means mounted in said housing above said sieve means, said sweeping means being constructed and arranged so that it is movable within close proximity to the top of said sieve means;

means for moving said sweeping means so as to cause said sweeping means to sweep said powder through said sieve means and deagglomerate said powder; and first and second adjustable baffle means for regulating the flow of said powder to said sieve means, said first and second baffle means being mounted to said housing above said sweeping means such that said first and second baffle means do not contact said sweeping means, wherein the angle of each of said baffle means is separately adjustable with respect to the other baffle means so as to be capable of forming a plurality of flow paths for said powder through said apparatus, from which a desired flow path is selected.

2. The apparatus of claim 1, wherein said first and second baffle means are continuously adjustable.

3. The apparatus of claim 1, wherein said first baffle is mounted to a first side of said housing and above said second baffle; and said second baffle is mounted to an opposite side of said housing.

4. The apparatus of claim 1, wherein said means for moving said sweeping means comprises a rotatable drum assembly mounted in said housing above said sieve means, said sweeping means being radially mounted on said drum assembly;

said drum assembly comprising a cylinder and a shaft passing through the longitudinal axis of said cylinder, said shaft being parallel to the plane of said sieve means;

said drum assembly causing said sweeping means to sweep said powder through said sieve means when said drum assembly is rotated.

5. The apparatus of claim 4, wherein said sweeping means comprises a plurality of sweepers mounted around the circumference of said drum assembly.

6. The apparatus of claim 5, wherein said sweepers are releasably mounted to said drum assembly.

7. The apparatus of claim 4, wherein said drum assembly is releasably mounted to said shaft and said shaft is releasably mounted to said housing.

8. The apparatus of claim 4, wherein at least a portion of said sieve means is arcuate.

9. The apparatus of claim 8, wherein said arcuate portion of said sieve means is substantially concentric with said drum assembly.

10. The apparatus of claim 1, wherein said sieve means comprises a screen.

11. The apparatus of claim 1, wherein said sieve means is releasably mounted in said housing.

12. The apparatus of claim 1, further comprising a powder pressing machine having means for holding said powder and a pressing means for pressing said powder in said holding means, said pressing machine being mounted beneath the housing of said deagglomerating apparatus so that said powder flows from said deagglomerating apparatus into said pressing machine.

13. The apparatus of claim 12, further comprising a hopper mounted below said sieve means and above said pressing means and said powder holding means, sifted powder flowing through said hopper before being pressed in said holding means.

14. A method for deagglomerating powder comprising:

depositing said powder through an opening and into a deagglomerating apparatus comprising a housing;

passing said powder past first and second adjustable baffle means in said apparatus and onto a sieve means mounted in said housing beneath said opening, said first and second baffle means regulating the flow of said powder onto said sieve means;

causing a sweeping means mounted in said housing above said sieve means to sweep said powder through said sieve means and thereby deagglomerate said powder, said sweeping means being of sufficient length to move in close proximity with the top of said sieve means; and adjusting the angle of each of said first and second baffle means with respect to the other so as to be capable of forming a plurality of flow paths for said powder through said apparatus, from which a desired flow path is selected.

15. The method of claim 14, wherein:

said sweeping means continuously sweeps said powder through said sieve means.

16. The method according to claim 14, wherein said means for moving said sweeping means comprises a rotatable drum assembly, said drum assembly being mounted above said sieve means and comprising a cylinder and a shaft passing through the longitudinal axis of said cylinder, said shaft being parallel to the plane of said sieve means;

said sweeping means being mounted radially on said drum assembly;

said drum assembly causing said sweeping means to sweep said powder through said sieve means when said drum assembly is rotated.

17. The method of claim 14, further comprising the steps of:

causing said powder to flow from said sieve means through a hopper and into a powder pressing machine, said pressing machine comprising means for holding said powder and a pressing means for pressing said powder in said holding means; and lowering said pressing means onto said powder held in said holding means to thereby press said powder;

wherein said pressing machine is mounted beneath said sieve means and beneath said hopper so that said pressing means is below said hopper and said sieve means while pressing said powder.

18. An apparatus for deagglomerating and pressing powder comprising:

a first housing having an opening for depositing powder into said apparatus;

a sieve means mounted in said first housing beneath said opening;

at least one sweeping means mounted in said first housing above said sieve means, said sweeping means being constructed and arranged so that it is movable within close proximity to the top of said sieve means;

means for moving said sweeping means so as to cause said sweeping means to sweep said powder through said sieve means and thereby deagglomerate said powder;

first and second adjustable baffle means, said first and second baffle means being mounted to said housing above said sweeping means such that said first and second baffle means do not contact said sweeping means, wherein the angle of each of said baffle means is separately adjustable with respect to the other baffle means so as to be capable of forming a plurality of flow paths for said powder through said apparatus, from which a desired flow path is selected; and a powder pressing machine comprising a hopper into which deagglomerated powder flows, a second housing for holding said powder which has passed through said hopper and a pressing means for pressing said powder held in said second housing;

said powder pressing machine being mounted beneath said sieve means, such that said powder flows from said sieve means through said hopper and into said second housing.

19. The apparatus of claim 18, wherein said sweeping means comprises a plurality of sweepers.

20. The apparatus of claim 18, wherein said sweeping means is a brush.

21. The apparatus of claim 20, wherein said brush comprises a plurality of synthetic bristles.

22. The apparatus of claim 18, further comprising a cover hingedly connected to said opening.

23. The apparatus of claim 18, wherein said means for moving said sweeping means comprises a rotatable drum assembly mounted in said first housing above said sieve means, said drum assembly comprising a cylinder and a shaft passing through the longitudinal axis of said cylinder, said shaft being parallel to the plane of said sieve means;

said sweeping means being mounted radially on said drum assembly;

said drum assembly causing said sweeping means to sweep said powder through said sieve means when said drum assembly is rotated.

24. The apparatus of claim 18, further comprising a first and second baffle means for regulating the flow of said powder through said first housing and to said sieve means, said baffle means being mounted in said first housing above said sweeping means, such that said baffle means does not contact said sweeping means.

25. The apparatus of claim 24, wherein said drum assembly is rotated by a drive means.

26. The apparatus of claim 25, wherein said drive means is an air-operated motor.

* * * * *

UNITED STATES PATENT AND TRADEMARK OFFICE
CERTIFICATE OF CORRECTION

PATENT NO. : 5,469,971
DATED : November 28, 1995
INVENTOR(S) : John B. Chilton et al.

It is certified that error appears in the above-indentified patent and that said Letters Patent is hereby corrected as shown below:

On the title page, Item [56],

References Cited, "184,430" should be -- 18,430 --.

References Cited, "10/1987" should be -- 10/1857 --.

Column 1, line 24, "in molds" should be -- molds in --.

Column 1, lines 37-38, "deagglomeratig" should be -- deagglomerating --.

Column 1, line 48, "appratus" should be -- apparatus --.

Column 2, line 38, "cut away" should be -- cutaway --.

Column 2, line 40, "cut away" should be -- cutaway --.

Column 3, line 46, "horizontal" should be -- horizontally --.

Column 3, line 64, "counter-clockwise" should be -- counterclockwise --.

Column 4, line 20, "have" should be -- has --.

Column 4, line 46, "used," should be -- used --.

Signed and Sealed this

Twentieth Day of July, 1999

Attest:

Q. TODD DICKINSON

*Attesting Officer*    *Acting Commissioner of Patents and Trademarks*